United States Patent [19]

Foster

[11] Patent Number: 5,267,670
[45] Date of Patent: * Dec. 7, 1993

[54] FUEL DISPENSING SYSTEM HAVING A FLEXIBLE HOSE WITH A STATIC DISSIPATOR AND A FUEL LEAK DETECTOR AND METHOD OF MAKING THE SAME

[75] Inventor: Randy C. Foster, Springfield, Mo.

[73] Assignee: Dayco Products, Inc., Dayton, Ohio

[*] Notice: The portion of the term of this patent subsequent to Feb. 16, 2010 has been disclaimed.

[21] Appl. No.: 959,312

[22] Filed: Oct. 9, 1992

Related U.S. Application Data

[62] Division of Ser. No. 800,349, Nov. 26, 1991, Pat. No. 5,186,357, which is a division of Ser. No. 575,723, Aug. 31, 1990, Pat. No. 5,102,012.

[51] Int. Cl.⁵ .............. B67D 5/12; G01M 3/08; F16L 11/11; B29C 27/04
[52] U.S. Cl. .............................. 222/1; 222/40; 141/44; 141/59; 138/104; 174/47; 340/605; 73/40.5 R; 200/61.04
[58] Field of Search .......... 222/40, 74, 75, 1; 141/44, 46, 59, 302; 138/104; 174/47; 340/605; 73/40.5 R; 200/61.04; 156/294

[56] References Cited

U.S. PATENT DOCUMENTS

| | | | |
|---|---|---|---|
| 2,759,175 | 8/1956 | Spalding | 138/104 X |
| 3,564,526 | 2/1971 | Butts | 340/242 |
| 3,721,898 | 3/1973 | Dragonmis et al. | 138/104 X |
| 3,882,382 | 5/1975 | Johnson | 138/104 X |
| 4,029,889 | 6/1977 | Mizuochi | 174/11 R |
| 4,108,701 | 8/1978 | Stanley | 174/47 X |
| 4,196,464 | 4/1980 | Russell | 361/215 |
| 4,206,632 | 6/1980 | Suzuki | 73/40.5 R |
| 4,215,384 | 7/1980 | Elson | 174/47 X |
| 4,312,383 | 1/1982 | Kleykamp | 138/103 |
| 4,405,969 | 9/1983 | Swavely | 174/47 X |
| 4,446,892 | 5/1984 | Maxwell | 138/104 |
| 4,589,275 | 5/1986 | Thomas et al. | 73/40.5 R |
| 4,667,505 | 5/1987 | Sharp | 73/405 R |
| 4,673,926 | 6/1987 | Gorman | 340/605 |
| 4,870,535 | 9/1989 | Matsumoto | 174/47 X |
| 4,932,257 | 6/1990 | Webb | 73/40.5 R |
| 5,005,613 | 4/1991 | Stanley | 141/55 |
| 5,081,326 | 1/1992 | Usui | 174/47 |

FOREIGN PATENT DOCUMENTS

| | | | |
|---|---|---|---|
| 1279191 | 11/1989 | Japan | 174/47 |
| 2211266 | 6/1989 | United Kingdom | 174/47 |

*Primary Examiner*—David M. Mitchell
*Assistant Examiner*—Kenneth De Rosa
*Attorney, Agent, or Firm*—Joseph V. Tassone

[57] ABSTRACT

A fuel dispensing system and method of making the same are provided, the system comprising a storage tank for the fuel and being disposed in the ground, a dispensing pump disposed above the ground, a first flexible hose construction having an inner surface and being disposed in the ground for conveying fuel from the tank to the pump, and a second flexible hose construction having opposed ends one of which is interconnected to the pump, the second hose construction being disposed above the ground for dispensing fuel from the pump into a fuel container of a transportation vehicle or the like through a nozzle interconnected to the other of the ends thereof, the second hose construction having electrical conductor structure extending therealong for dissipating static electricity from the nozzle to the pump, the first hose construction having leak detection structure for detecting leakage of the fuel therein through the inner surface therof and for providing an electrical conductor structure therealong for dissipating static electricity from the pump to the storage tank.

20 Claims, 3 Drawing Sheets

FUEL DISPENSING SYSTEM HAVING A FLEXIBLE HOSE WITH A STATIC DISSIPATOR AND A FUEL LEAK DETECTOR AND METHOD OF MAKING THE SAME

CROSS REFERENCE TO RELATED APPLICATIONS

This application is a divisional patent application of its copending parent patent application Ser. No. 800,349, filed Nov. 26, 1991, now U.S. Pat. No. 5,186,357, which, in turn, is a divisional patent application of its copending parent patent application Ser. No. 575,723, filed Aug. 31, 1990, now U.S. Pat. No. 5,102,012.

BACKGROUND OF THE INVENTION

1. Field of the Invention

This invention relates to a new fuel dispensing system and to a new method of making such a fuel dispensing system.

2. Prior Art Statement

It is known to provide a fuel dispensing system comprising a storage tank for the fuel and being disposed in the ground, a dispensing pump means disposed above the ground, a first flexible hose construction having an inner surface means and being disposed in the ground for conveying fuel from the tank to the pump means, and a second flexible hose construction having opposed end means one of which is interconnected to the pump means, the second hose construction being disposed above the ground for dispensing fuel from the pump means into a fuel container of a transportation vehicle or the like through a nozzle means interconnected to the other of the end means thereof, the second hose construction having electrical conductor means extending therealong for dissipating static electricity from the nozzle to the pump means. For example, see the now allowed copending patent application Ser. No. 192,253, of Rodger P. Grantham, filed Apr. 25, 1988, wherein the second hose construction has electrical conductor means extending therealong for dissipating static electricity from the nozzle to the pump means.

It is also known to provide conductive polymeric means from one end of a flexible hose construction to the other end thereof. For example, see the U.S. Pat. No. 4,312,383, to Kleykamp, and the U.S. Pat. No. 4,196,464, to Russell.

It is also known to provide electrical conductive means in the structure of a flexible hose construction from one end thereof to the other end thereof to form part of a leak detection means for detecting leakage of liquid through the inner surface means thereof. For example, see the U.S. Pat. No. 4,446,892 to Maxwell.

It is also known to provide means for detecting the leakage of fuel through a hose construction disposed in the ground and interconnecting a storage tank to an above-the-ground pump means. For example, see the U.S. Pat. No. 4,673,926 to Gorman; the U.S. Pat. No. 4,667,505 to Sharp; the U.S. Pat. No. 4,029,889 to Mizuochi and the U.S. Pat. No. 3,564,526 to Butts.

SUMMARY OF THE INVENTION

It is one feature of this invention to provide a new fuel dispensing system wherein the flexible hose construction that interconnects a below-the-ground storage tank to an above-the-ground dispensing pump means has leak detection means for detecting leakage of the fuel therein through the inner surface means thereof and for providing an electrical conductive means therealong for dissipating static electricity from the pump means to the storage tank.

In particular, it is believed according to the teachings of this invention that since the flexible hose construction that is disposed above the ground and interconnects the above-ground pump means to a nozzle that is utilized for dispensing fuel into a fuel container of a transportation vehicle or the like has electrical conductor means extending therealong for dissipating static electricity from the nozzle to the pump means, then the other hose construction that interconnects the pump means to the storage tank means that is disposed in the ground could likewise have electrical conductor means extending therealong for dissipating the static electricity from the pump means to the storage tank and such electrical conductor means can additionally be utilized for detecting leakage of the fuel therein through the inner surface means thereof whereby such electrical conductive means of the flexible hose construction that is disposed in the ground provides a unique dual purpose.

Accordingly, one embodiment of this invention provides a fuel dispensing system comprising a storage tank for the fuel and being disposed in the ground, a dispensing pump means disposed above the ground, a first flexible hose construction having an inner surface means and being disposed in the ground for conveying fuel from the tank to the pump means, and a second flexible hose construction having opposed end means one of which is interconnected to the pump means, the second hose construction being disposed above the ground for dispensing fuel from the pump means into a fuel container of a transportation vehicle or the like through a nozzle means interconnected to the other of the end means thereof, the second hose construction having electrical conductor means extending therealong for dissipating static electricity from the nozzle to the pump means, the first hose construction having leak detector means for detecting leakage of the fuel therein through the inner surface means thereof and for providing an electrical conductor means therealong for dissipating static electricity from the pump means to the storage tank.

Accordingly, it is an object of this invention to provide a new fuel dispensing system having one or more of the novel features of this invention as set forth above or hereinafter shown or described.

Another object of this invention is to provide a new method of making such a dispensing system, the method of this invention having one or more of the novel features of this invention as set forth above or hereinafter shown or described.

Another object of this invention is to provide a new flexible hose construction for such a system, the hose construction of this invention having one or more of the novel features of this invention as set forth above or hereinafter shown or described.

Another object of this invention is to provide a new method of making such a new hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
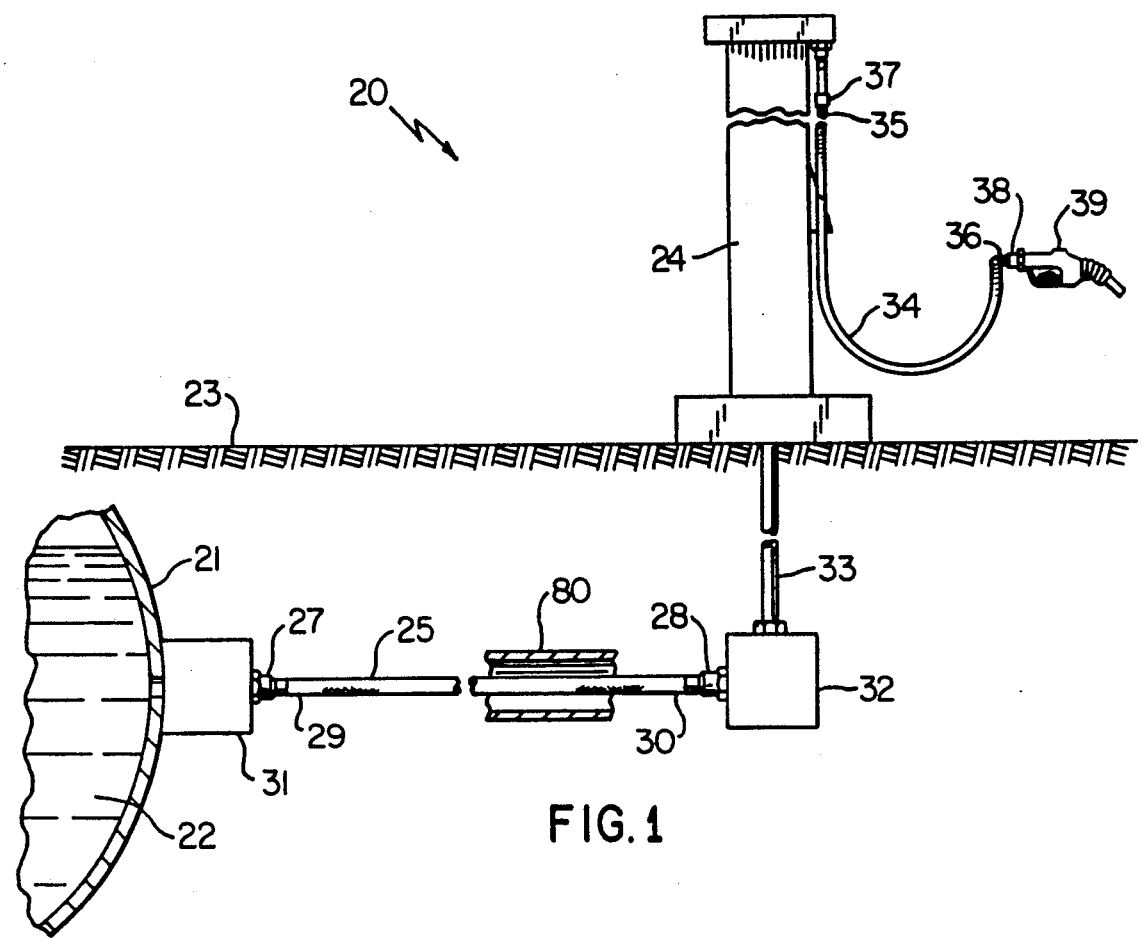
FIG. 1 is a schematic view illustrating the new fuel dispensing system and method of this invention.

While the various features of this invention are hereinafter illustrated and described as being particularly adapted to provide a system for dispensing fuel, such as gasoline, it is to be understood that the various features of this invention can be utilized singly or in various combinations thereof to provide a system for dispensing any other desired fluid therethrough for other types of uses as desired.

Therefore, this invention is not to be limited to only the embodiment illustrated in the drawings, because the drawings are merely utilized to illustrate one of the wide variety of uses of this invention.

Figure 5:
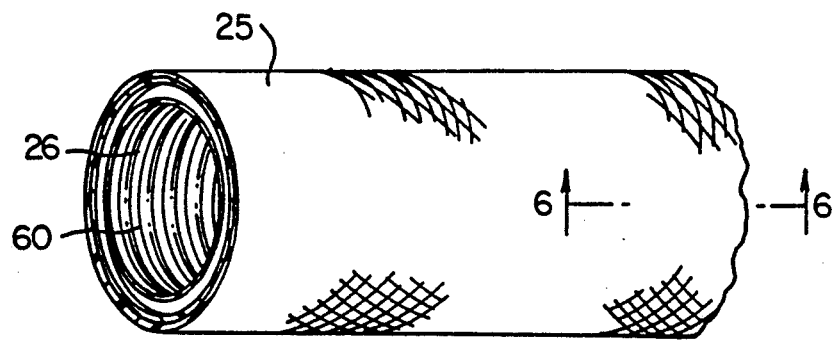
FIG. 5 is a fragmentary perspective view of the below-the-ground hose construction of the system of FIG. 1.
Figure 6:
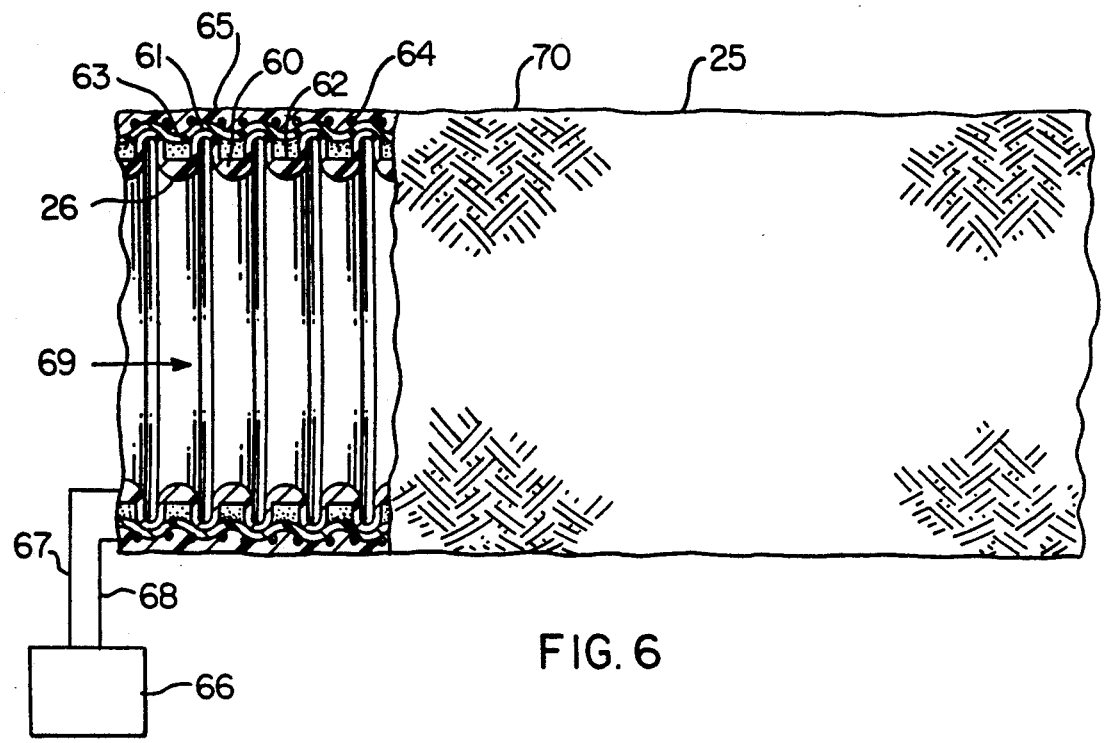
FIG. 6 is an enlarged fragmentary cross-sectional view taken on line 6—6 of FIG. 5 and illustrates schematically a leak detection structure interconnected thereto.

Referring now to FIG. 1, the new fuel dispensing system and method of this invention is generally indicated by the reference numeral 20 and comprises a storage tank 21 for storing fuel 22 therein in a conventional manner, the tank 21 being disposed in the ground 23 and thereby being earth grounded also in a conventional manner. A dispensing pump means of the system 20 is disposed on the ground 23 so as to be above the ground in a conventional manner. A first flexible hose construction 25 having an inner surface means 26, FIGS. 5 and 6, is also disposed in the ground 23 for conveying fuel from the storage tank 21 to the pump means 24 in a conventional manner, the flexible hose construction 25 having coupling means 27 and 28 disposed at opposed end means 29 and 30 thereof for respectively coupling to junction means 31 and 32 respectively of the storage tank 21 and pump means 24 in a manner hereinafter described.

While the junction means 32 for the pump means 24 is illustrated as being disposed in the ground 23 and being interconnected to the pump means 24 by a conveying means 33, it is to be understood that other junction means can be provided for interconnecting the end 30 of the hose construction 25 to the pump means 24 as desired. Also, the hose construction 25 could have one or more junction means between the end means 29 and 30 thereof, if desired.

The system and method 20 of this invention also comprises a second flexible hose construction 34 having opposed end means 35 and 36 respectively interconnected by coupling means 37 and 38 to the pump means 24 and a dispensing nozzle means 39 in a conventional manner so that the nozzle means 39 can dispense fuel from the pump means 24 into a fuel container (not shown) of a transportation vehicle or the like (not shown) in a conventional manner as the pump means 24 receives fuel from the storage tank 21 through the first hose construction 25 all in a manner well known in the art. For example, see the aforementioned U.S. Pat. No. 4,673,926 to Gorman; the U.S. Pat. No. 4,667,505 to Sharp; the U.S. Pat. No. 4,029,889 to Mizuochi and the U.S. Pat. No. 3,564,526 to Butts, whereby these four U.S. patents are being incorporated into this disclosure by this reference thereto.

The second hose construction 34 can be of the type that is set forth in the aforementioned copending U.S. patent application Ser. No. 192,253, of Rodger P. Grantham, filed Apr. 25, 1988, and since this application has now been allowed by the U.S. Patent and Trademark Office, this copending patent application is being incorporated into this disclosure by this reference thereto.

Since the structure of the hose construction 34 is fully disclosed in such aforementioned copending patent application, only the structure thereof that is believed necessary to understand the features of this invention will now be described.

Figure 2:
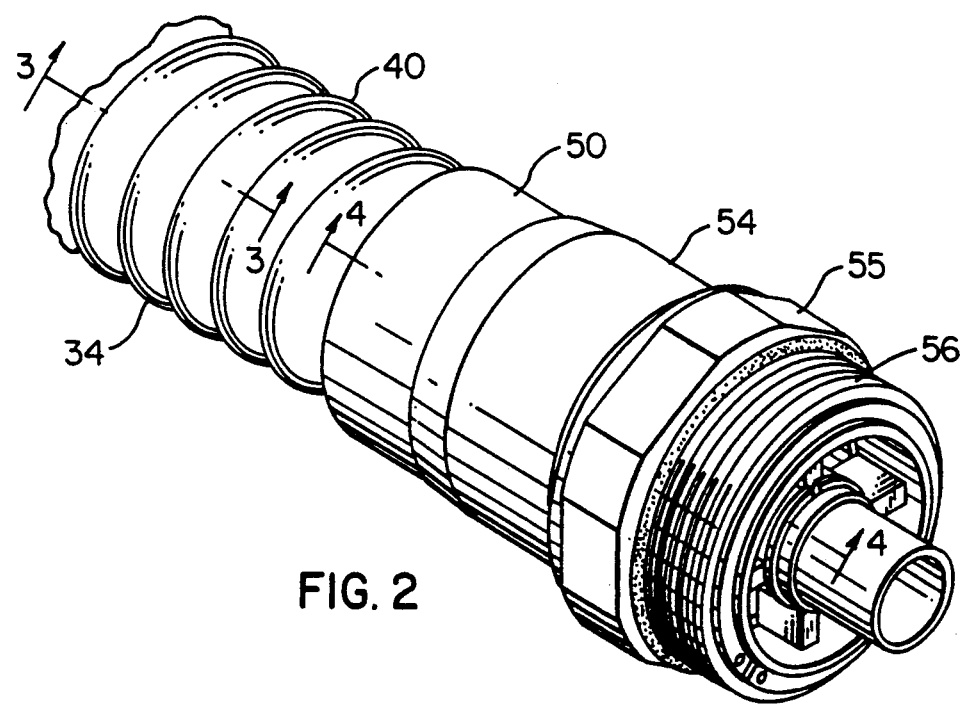
FIG. 2 is an enlarged fragmentary perspective view of part of the above-ground hose construction of FIG. 1.
Figure 3:
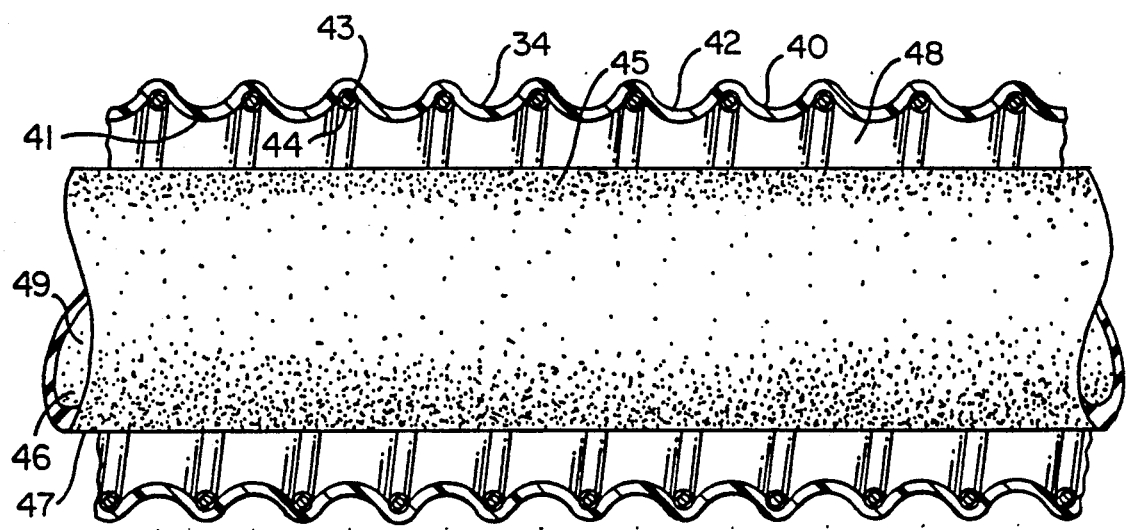
FIG. 3 is an enlarged fragmentary cross-sectional view taken on line 3—3 of FIG. 2.

As illustrated in FIGS. 2 and 3, the hose construction 34 includes an outer flexible tubular member 40 having inner surface means 42 and being formed of any suitable flexible polymeric material. A reinforcing conducting wire means 43 being covered with electrical insulating means 44 is helically disposed in engagement with the internal peripheral surface means 41 of the outer hose 40 and can be secured thereto in the manner illustrated in FIG. 3 whereby the conductive wire 43 extends between the opposed ends 35 and 36 of the hose construction 34 not only for the purpose of reinforcing the outer hose 40 but also for dissipating static electricity between the nozzle means 39 and the pump means 24 as will be apparent hereinafter and as set forth in the aforementioned copending patent application of Rodger P. Grantham.

The second flexible hose construction 34 includes an inner flexible hose 45 having an internal peripheral surface means 46 and an external peripheral surface means 47 and being disposed in the outer hose 40 in such a manner that the same defines an outer passage means 48 therewith that is defined between the inner peripheral surface means 41 of the outer hose 40 and the outer peripheral surface means 47 of the inner hose 45.

The inner hose 45 is adapted to convey the product, such as the gasoline being delivered by the pump means 24, through an internal passage 49 defined by the internal peripheral surface means 46 of the inner hose 45 to the nozzle 39 to be dispensed out of the same whereas the outer passage 48 in the hose construction 34 is adapted to return fuel vapors, that are created from the dispensing operation at the nozzle means 39 and container means of the transportation vehicle receiving the gasoline, back to the pump means 24 for vapor recovery purposes all in a manner well known in the art.

Figure 4:
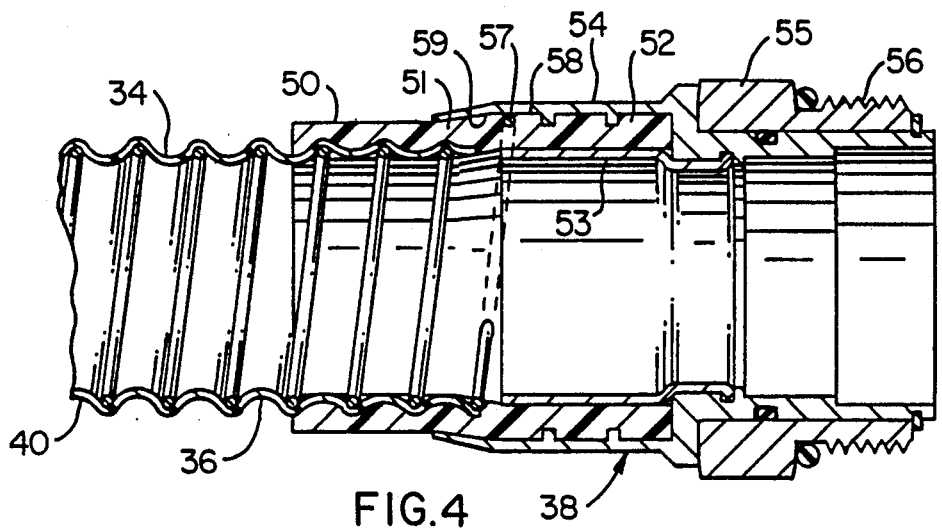
FIG. 4 is a fragmentary cross-sectional view taken on line 4—4 of FIG. 2 and has the inner product hose thereof removed.

The opposed ends 35 and 36 of the hose construction 34 are coupled to the coupling means 37 and 38 substantially in a like manner whereby only the coupling means 38 is illustrated in FIG. 4 for the end 36 of the hose construction 34 whereby it is to be understood that the other end 35 has its coupling means 37 formed in a similar manner.

As illustrated in FIG. 4, the end 36 of the outer hose 40 is disposed and secured within an end 50 of a polymeric cuff 51 that has its other end 52 sandwiched between an internal metallic sleeve means 53 and an outer metallic sleeve means 54, the outer sleeve means 54 having a rotatable nut-like means 55 disposed thereon and provided with external threads 56 for coupling to the desired structure of the nozzle 39 all in a manner fully set forth in the aforementioned copending patent application of Rodger P. Grantham.

The wire 43 of the outer hose 40 has the insulation 44 thereof removed at the end means 57 thereof and the end means 57 is forced through the polymeric cuff 51 so as to be disposed on the outer peripheral surface 58 thereof and thereby be disposed in electrical contact with the internal peripheral surface 59 of the outer conductive sleeve means 54 so that the metallic parts of the coupling 38 are electrically interconnected to the like conductive parts of the coupling 37 at the other end 35 of the hose construction 34 by the conductive wire 43 whereby any electrostatic buildup at the nozzle means 39 and/or anywhere along the hose construction 34 will be dissipated through the conductive wire 43 from the nozzle 39 and/or other area to the pump means 24 all in a manner well known in the art.

However, it is believed that the first flexible hose construction 25 of this invention can be provided with means in a manner hereinafter set forth to not only electrically interconnect the pump means 24 to the metallic storage tank means 21 so as to dissipate such electrostatic energy that has been dissipated to the storage tank 21 and, thus, to earth ground, but also it is believed that such means can provide means for detecting any leakage of the fuel passing through the hose construction 25 that penetrates through the inner peripheral surface means 26 thereof and before the leaking fuel reaches the exterior of the hose construction 25, as will be apparent hereinafter.

While the hose construction 25 is of the type that is fully disclosed and claimed in a copending patent application Ser. No. 405,487, of Jeffrey J. Winters et al, filed Sep. 11, 1989, sufficient details of the hose construction 25 will now be described in order to fully understand the features of this invention.

As illustrated in FIGS. 5 and 6, the hose construction 25 comprises an inner corrugated hose 60 formed of any suitable conductive polymeric material and having a plurality of outwardly convex projections 61 with recesses 62 therebetween and extending from the one end means 29 to the other end means 30 thereof, a tube 63 of any suitable nonconductive polymeric material extending in a generally straight line manner from projection 61 to projection 61 as illustrated in FIG. 6, an outer sleeve 64 of reinforcing wire or textile material disposed in a telescoping relation on the tube 63, and an outer layer 65 of any suitable conductive polymeric material that will provide a protection for the reinforcing sleeve 64 so as to tend to prevent any liquid that is conveyed through the flexible hose construction 25 from permeating to the exterior thereof, such as the gasoline and the like previously described.

The tube 63 can be bonded to the projections 61 of the inner corrugated hose 60 and the outer polymeric layer 65 can exude through the reinforcement layer 64 to bond to the tube 63 whereby the tube 63 not only prevents the reinforcement layer 64 from entering into the recesses 62 of the inner corrugated hose 60 an amount that would tend to reduce the flexibility characteristics of the inner hose 60, but also the tube 63 electrically insulates the inner tube 60 from the outer tube 65.

Therefore, it is believed according to the teachings of this invention that by making the inner corrugated tube 60 as well as the outer tube or layer 65 of a conductive polymeric material, not only will such conductive tubes 60 and 65 provide conductive means for dissipating static electricity from the pump means 24 and/or anywhere along the hose construction 25 to the storage means 21 and, thus, to earth ground, but also such conductive layers 60 and 65 can provide part of a leak detection means.

For example, it can be seen in FIG. 6 that a sensing device 66 can have leads 67 and 68 thereof respectively electrically interconnected to the inner conductive polymeric tube 60 and the outer conductive polymeric tube 65 so that should the gasoline being conveyed through the interior passage 69 of the hose construction 25 permeate or leak through the inner corrugated tube 60 of the hose construction 25 as well as through the inner tube 63, such leaking liquid will electrically interconnect the inner corrugated conductive tube 60 to the outer conductive polymeric tube 65 and such electrical interconnection of the tubes 60 and 65 will be detected by the detecting means 66 which could sound an alarm, or provide other indication means or warning means to the operators of the system 20 to indicate that a leakage situation is occurring within the flexible hose construction 25 before such leaking liquid reaches the external peripheral surface 70 of the outer layer 65 of the hose construction 25.

For example, such sensing and indication means can be similar to such sensing and indicating means set forth in the aforementioned U.S. Pat. No. 4,446,892, to Maxwell, as well as set forth in the previously mentioned four U.S. Pat. Nos. 4,673,926; 4,667,505; 4,029,889 and 3,564,526, whereby the U.S. Pat. No. 4,446,892, to Maxwell, is also being incorporated into this disclosure by this reference thereto.

As previously stated, any suitable conductive polymeric material can be utilized for forming the inner corrugated tube 60 and outer sleeve or tube 65 of the hose construction 25 with such polymeric material being the same or different for the tubes 60 and 65. For example, such conductive polymeric material could be of the type set forth in the aforementioned U.S. Pat. No. 4,312,383 to Kleykamp, and the U.S. Pat. No. 4,196,464 to Russell, whereby these two U.S. patents are also being incorporated into this disclosure by this reference thereto.

While the detection means 66 is illustrated in FIG. 6 as being interconnected to the hose construction 25 directly to the inner and outer tubes 60 and 65 thereof, it is to be understood that the detection means 66 could be located anywhere along the hose construction 25 and, if desired, could be located at the coupling means 27 and 28 thereof. Of course, a plurality of devices 66 could be located at various areas along the hose construction 25 so as to pinpoint where any leakage might be taking place.

Figure 7:
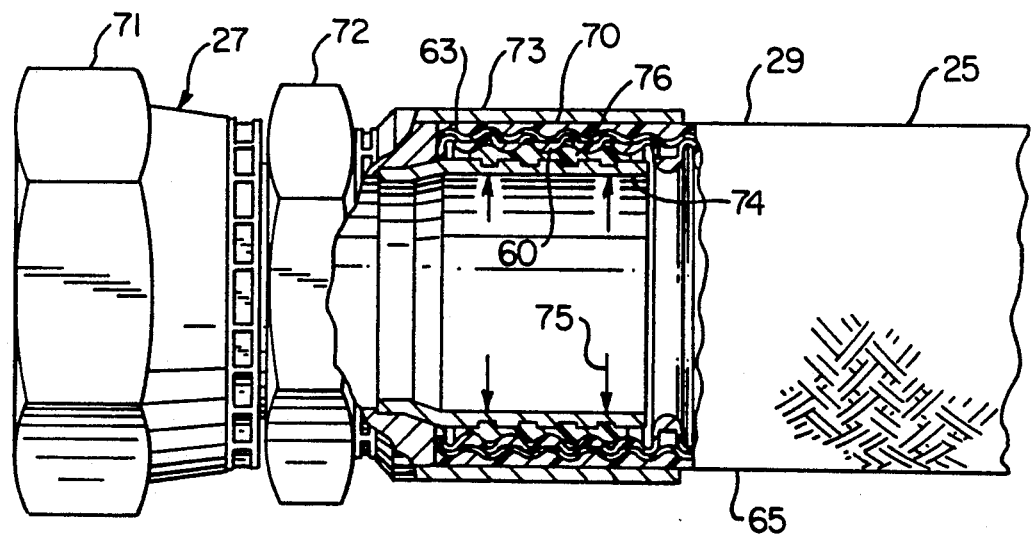
FIG. 7 is a fragmentary view, partially in cross section, illustrating one of the conductive ends of the below-the-ground hose construction of FIG. 1.

In any event, the coupling means 27 and 28 at the opposed ends 29 and 30 of the hose construction 25 can be formed in a like manner whereby only the coupling structure 27 at the end 29 of the hose construction 25 is illustrated in FIG. 7 and will now be described, the coupling structure 27 being fully disclosed and claimed in a copending patent application Ser. No. 408,161, of John D. Sanders et al, filed Sep. 15, 1989, whereby only sufficient details of the coupling structure 27 will be described that are believed necessary to understand the features of this invention.

As illustrated in FIG. 7, the coupling structure 27 includes a conductive coupling nut 71 rotatably carried on a conductive body member 72 that defines an outer conductive sleeve 73 disposed against the external peripheral surface 70 of the hose construction 25 at the end 29 thereof in a telescoping manner. Another conductive metallic sleeve 74 is disposed inside the end 29 of the hose construction 25 and is outwardly radially expanded as indicated by the arrows 75 in FIG. 7 to compress the end 29 of the hose construction 25 between the outer sleeve 73 and an inner polymeric insert 76 carried by the sleeve 74 whereby it can be seen that the outer conductive sleeve 73 will be disposed in electrical contact with the outer conductive tube 65 of the hose construction 25 not only for dissipating the static electricity to that coupling structure 27 and, thus, to the storage tank 21 but also the insert 76 of the coupling structure 72 could likewise be formed of conductive material so as to interconnect the inner conductive tube 60 of the hose construction 25 to the coupling structure 27 and, thus, to the storage tank 21.

However, if it is desired to prevent electrical connection between the inner tube 60 and the outer tube 65 at the opposed ends 29 and 30 of the hose construction 25, the inserts 76 will prevent such electrical connection between the tubes 60 and 65 so that the detection means 66 could have its lead 67 electrically disposed between the inserts 76 and the inner tube 60 at the time the couplings 27 and 28 are formed, if desired.

In any event, it can be seen that the hose construction 25 of this invention provides leak detection means for detecting leakage of the fuel in the passage 69 thereof that leaks through the inner surface means 26 thereof and through the insulating tube 63 to the outer tube 65 before such leakage of liquid reaches the external peripheral surface 70 of the hose construction 25 with such leak detection means also providing an electrical conductive means along the hose construction 25 for dissipating static electricity from the pump means 24 and/or anywhere along the hose construction 25 to the storage tank 21 and, thus, to earth ground whereby the conductive means of the hose construction 25 provides a dual purpose thereof.

However, while the conductive means of the hose construction 25 of this invention have been described as being conductive polymeric tubes thereof, it is to be understood that other conductive means can be utilized therewith or in place thereof, if desired.

Further, it is to be understood that while the hose construction 25 can be disposed directly in the ground 23 between the storage tank means 21 and the junction means 32 as illustrated in FIG. 1, a secondary containment means that is indicated by the reference numeral 80 in FIG. 1 can be used and can comprise a tubular member that surrounds the hose construction 25 to separate the same from the ground 23 in a manner well known in the art. Also, while only one pump means 24 is illustrated for the storage tank 21, it is to be understood that more than one such pump means 24 can be interconnected to the storage tank 21, if desired.

In any event, it can be seen that this invention not only provides a new fuel dispensing system, but also this invention provides a new method of making and operating such a fuel dispensing system.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A hose construction for a fuel dispensing system, said hose construction having an inner surface, and opposite first and second ends, said hose construction comprising:
   a first electrical conductor means disposed along the hose end to said second end and for forming a portion of a leak detection means for detecting leakage of fluid through said inner surface.

2. A hose construction as set forth in claim 1 wherein said hose construction comprises a plurality of tubular members disposed in telescoping relation, one of said tubular members comprising said first electrical conductor means of said hose construction.

3. A hose construction as set forth in claim 2 wherein another of said tubular members of said hose construction comprises another portion of said leak detection means.

4. A hose construction as set forth in claim 3 wherein the other of said tubular members comprises a second electrical conductor means.

5. A hose construction as set forth in claim 4 wherein a third of said tubular members comprises an electrical insulating structure disposed between said first electrical conductor means and said second electrical conductor means.

6. A hose construction as set forth in claim 5 wherein said first electrical conductor means and said second electrical conductor means of said hose construction each comprises a tubular member formed of a conductive polymeric material.

7. A hose construction as set forth in claim 6 wherein one of said first electrical conductor means and said second electrical conductor means of said hose construction defines an outer peripheral surface of said hose construction.

8. A hose construction as set forth in claim 7 wherein the other of said first electrical conductor means and said second electrical conductor means of said hose construction comprises said inner surface thereof.

9. A hose construction as set forth in claim 2 wherein said one of said tubular members is formed of conductive polymeric material.

10. A hose construction as set forth in claim 9 wherein said one of said tubular members defines an outer peripheral surface of said hose construction.

11. A method of making a hose construction for a fuel dispensing system, said hose construction having an inner surface, and opposite first and second ends, said method comprising the steps of:
   forming a first electrical conductor means disposed along the hose construction for dissipating static electricity from said first end to said second end and for forming a portion of a leak detection means for detecting leakage of fluid through said inner surface.

12. A method as set forth in claim 11 and including the steps of forming said hose construction to comprise a plurality of tubular members disposed in telescoping relation, and forming one of said tubular members to comprise said first electrical conductor means of said hose construction.

13. A method as set forth in claim 12 and including the step of forming another of said tubular members of said hose construction to comprise another portion of said leak detection means.

14. A method as set forth in claim 13 and including the step of forming the other of said tubular members to comprise a second electrical conductor means.

15. A method as set forth in claim 14 and including the step of forming a third of said tubular members to comprise an electrical insulating structure disposed between said first electrical conductor means and said second electrical conductor means.

16. A method as set forth in claim 15 and including the step of forming said first electrical conductor means and said second electrical conductor means of said hose construction to each comprise a tubular member formed of a conductive polymeric material.

17. A method as set forth in claim 16 and including the step of forming one of said first electrical conductor means and said second electrical conductor means of said hose construction to define an outer peripheral surface of said hose construction.

18. A method as set forth in claim 16 and including the step of forming the other of said first electrical conductor means and said second electrical conductor means of said hose construction to comprise said inner surface thereof.

19. A method as set forth in claim 12 and including the step of forming said one of said tubular members of conductive polymeric material.

20. A method as set forth in claim 19 and including the step of forming said one of said tubular members to define an outer peripheral surface of said hose construction.

* * * * *